United States Patent [19]

Liang

[11] Patent Number: 5,323,249
[45] Date of Patent: Jun. 21, 1994

[54] METHOD FOR REPRODUCING COLOR IMAGES HAVING ONE COLOR GAMUT WITH A DEVICE HAVING A DIFFERENT COLOR GAMUT

[75] Inventor: Zhongjie Liang, Sewell, N.J.

[73] Assignee: E. I. Du Pont de Nemours and Company, Wilmington, Del.

[21] Appl. No.: 3,170

[22] Filed: Jan. 12, 1993

[51] Int. Cl.$^5$ .............................................. H04N 1/46
[52] U.S. Cl. .................................. 358/518; 358/520; 358/523; 348/659
[58] Field of Search ................. 358/518, 520, 523, 30; 395/109, 131

[56] References Cited

U.S. PATENT DOCUMENTS

| | | |
|---|---|---|
| 4,060,829 | 11/1977 | Sakamoto . |
| 4,127,871 | 11/1978 | Sakamoto . |
| 4,409,614 | 10/1983 | Eichler et al. . |
| 4,500,919 | 2/1985 | Schreiber . |
| 4,941,038 | 7/1990 | Walowit . |
| 4,959,790 | 9/1990 | Morgan . |

FOREIGN PATENT DOCUMENTS

0173032  3/1986  European Pat. Off. .

OTHER PUBLICATIONS

P. Kubelka, "New Contributions to the Optics of Intensely Light Scattering Materials," Part I, Journal of Optical Society of America vol. 38, pp. 448-457.
W. L. Rhodes, "Proposal for an Empirical Approach to Color Reproduction," Color Research and Reproduction, vol. 3, No. 4, Winter 1978, pp. 197-201.
H. E. J. Neugebauer, "Unsolved Problems of Color Reproduction," Technical Association of the Graphic Arts, Tenth Annual Meeting, Jun. 23-26, 1958 pp. 45-56.
D. L. Spooner, "Digital Simulation of Prepress Proofing Systems," SPIE vol. 1184 Neugebauer Memorial Seminar on Color Reproduction, 1989, 131-135.
W. K. Pratt, "Digital Image Processing" Second Edition pp. 60-73.
Berns, R. S. "Colorimetry for Electronic Imaging Systems" 1991.
The Munsell Color Science Laboratory, Rochester Institute of Technology Chapter 27 pp. 1-4; Chapter 28 pp. 1-14.
M. C. Stone et al., "Color Gamut Mapping and the Printing of Digital Color Images," ACM Transactions on Graphics, vol. 7, No. 4, Oct. 1988, pp. 249-292.
R. S. Gentile et al., "A Comparison of Techniques for Color Gamut Mismatch Compensation," Journal of Imaging Technology, vol. 16, No. 5, Oct. 1990, pp. 176-181.
R. W. G. Hunt, "Measuring Colour," Published by Ellis Horwood Limited, Chapter 3, pp. 53-73.

*Primary Examiner*—Edward L. Coles, Sr.
*Assistant Examiner*—Scott A. Rogers

[57] ABSTRACT

A method for reproducing color images comprising matching the color gamut of an image produced by a first device to the color gamut of a second device used for reproducing said image, wherein in the matching process, the color gamut of the first device is mapped onto the color gamut of the second device in the second device dependent color space by extrapolation, using data from both device independent and device dependent color spaces.

5 Claims, 4 Drawing Sheets

METHOD FOR REPRODUCING COLOR IMAGES HAVING ONE COLOR GAMUT WITH A DEVICE HAVING A DIFFERENT COLOR GAMUT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Field of the Invention

This invention relates to a method for reproducing color images and more particularly a method of reproducing color images having one color gamut with a device having a different color gamut.

Description of Related Art

In the reproduction of color images the situation is often encountered wherein the reproducing device has the ability to reproduce a number of colors which may or may not represent all the colors present in the image to be reproduced. This is particularly true where the reproduction involves a change of medium, such as when a photographic slide is reproduced as a printed image in a magazine. The color gamut (gamut being the total number of displayable colors with an output device) of the photographic transparency is typically larger than the gamut of colors that can be reproduced through the printing process which relies on the use of inks on paper.

FIG. 1 is a chromaticity diagram which graphically shows such a situation. All colors are represented by points in the area bounded by the large curve or line 2. The colors that may be produced by any system are included within this large curve or line 2. The gamut of any device or color reproduction system using three components, such as $RGB_{(cie)}$, is represented by all colors within an area enclosed by the lines, e.g., lines 4 and 6, connecting the three component colors. For a complete discussion of the chromaticity diagrams as a method of color representation see, in general, "*Measuring Color*" by R. W. G. Hunt, distributed by Halsted Press, a Division of John Wiley and Sons, 605 third Ave. New York, N.Y. 10158, U.S.A., and particularly Chapter 3.

Unless specifically noted otherwise, RGB as used in this application will indicate device dependent color values, and $RGB_{(cie)}$ will be used to indicate colorimetric tristimulus values in a device independent color space as defined by the Commission Internationale de L'Eclairage (International Commission on Illumination) C.I.E. Chromaticity diagrams are plotted in device independent color space.

In FIG. 1, the color gamut bounded by $R_1G_1B_{1(cie)}$ is different from the color gamut bounded by $R_2G_2B_{2(cie)}$. Certain colors in $R_1G_1B_{1(cie)}$ cannot be reproduced exactly by a device which reproduces only the color gamut bounded by $R_2G_2B_{2(cie)}$.

One solution to this problem is to simply truncate any color value from the $R_2G_2B_{2(cie)}$ gamut which falls outside the $R_1G_1B_{1(cie)}$ gamut and substitute for all such outside values a value falling on the limit of the $R_1G_1B_{1(cie)}$ along lines $B_1$-$G_1$, $G_1$-$R_1$, or $R_1$-$B_1$. Another solution is to compress the full scale of values in the $R_2G_2B_{2(cie)}$ gamut so that the compressed gamut falls within the $R_1G_1B_{1(cie)}$ gamut of values. A third and preferred solution is to compress only that portion of the $R_2G_2B_{2(cie)}$ gamut which is adjacent the limits of the $R_1G_1B_{1(cie)}$ gamut.

Different methods of color compression are known in the prior art, and are discussed briefly in "*Colorimetry for Electronic Imaging Systems, An Intensive short course for Scientists and Engineers*" by Richard S. Hunter, Munsell Color Science Laboratory, Rochester Institute Of Technology, One Lomb Memorial Drive, Rochester N.Y. 14623-0887, Chapters 27 and 28.

Gamut compression techniques are also discussed in an article by R. S. Gentile et al. entitled "*A comparison of Techniques for Color Gamut Mismatch compensation*" which appeared in the "Journal Of Imaging Technology" Volume 16, No. 5, October 1990, pp 176-181.

A problem with color compression is that it is practiced in a color space that is device independent, since the color gamuts are expressed in a device independent color space to permit comparisons between color images generated by different devices; in addition, the compression process requires that the limits of the two gamuts be accurately known, and that the direction along which the compression occurs be such that compression paths from two or more points outside the gamut to which they are compressed do not cross, producing a point within the desired gamut common to two or more compressed points from outside the gamut. FIGS. 2(*a*) and 2(*b*) illustrate such a situation.

In FIGS. 2(*a*) and 2(*b*), two 3 dimensional color gamuts 3, 5 are depicted in two, two dimensional representations of a device independent color space "Lab". One of the gamuts 3 represents the gamut of an original image. The other gamut 5 represents the gamut of the reproduction process. In FIG. 2(*a*), "L" is depicted as a function of "a". In FIG. 2(*b*), "a" is depicted as a function of "b". In the "a" vs "b" domain, to maintain proper hue, compression will be performed along a line connecting the out of gamut points and the "a"=0 and "b"=0 point. In the "L" vs "a" domain, a compression technique is often used according to which a point outside the second gamut is brought inside the second gamut along a path leading to the nearest point on the envelope of the second gamut, i.e., perpendicular to the envelope. Depending on the shape of the gamut envelope, points $P_1$ and $P_2$ may lie along two intersecting lines. Point $P_3$ may thus represent a compressed value for either $P_1$ or $P_2$, meaning that two colors that were different in one representation, will be rendered the same in another.

Avoiding this type of problem is very complex in practice, since non intersecting paths for a large number of possible colors must be calculated in a three dimensional environment in the device independent color space. This problem is further aggravated in practice since most image color data is supplied and used in device dependent color spaces such as scanner outputs RGB rather than CIE defined RGB values, and YMCK graphic arts ink color inputs. Therefore, device dependent to device independent value conversions must be performed prior to the gamut compression and then, after compression, the data is reconverted to device dependent values.

There is thus still need for a method of color image reproduction with a gamut matching process which will avoid the aforementioned difficulties and will provide acceptable results without unduly burdensome calculations.

These and other objects of the present invention will be clear from the following description.

SUMMARY OF THE INVENTION

The present invention is method for reproducing a color image having color values in a first color gamut with a device able to reproduce color values representing a second color gamut wherein the first color gamut includes color values outside the second color gamut, the first and second color gamuts defined in a device independent color space, comprising:

(1) creating a LUT comprising a first preselected plurality of color values from the first color gamut, and a corresponding second plurality of derived color values, wherein (a) for each one of the first plurality of color values for which there is a corresponding color value in said second color value gamut, the derived color value is calculated to reproduce through the device a color having a same colorimetric measure in a device independent color space as the color represented by the one of the first plurality of preselected color values, and (b) for each one of the first plurality of color values for which there is no corresponding color value in the second color value gamut, the derived color value is calculated by:

(i) identifying at least two adjacent preselected color values to the color value for which there is no corresponding color value in the device independent color space which is within the color gamut of the device, the two adjacent color values being values for which there are color values in the device independent color space which are within the color gamut of the device, and the corresponding derived values, and (ii) deriving by extrapolation in the device dependent space from the adjacent preselected and derived values a corresponding derived value resulting in an acceptable color representation of the preselected color value within the device color gamut;

(2) using the LUT to modify input color values representing the image; and (3) using the modified input color values to reproduce the image with the device.

The present method may further include an additional step of using interpolation to derive corresponding color values for any image color value not included among the preselected values contained in the LUT, using existing preselected values and corresponding derived ones adjacent to the not included image color value.

BRIEF DESCRIPTION OF THE DRAWINGS

The invention can be more fully understood from the following description thereof in connection with the accompanying drawings described as follows.

DESCRIPTION OF THE PREFERRED EMBODIMENT(S)

Figure 1:
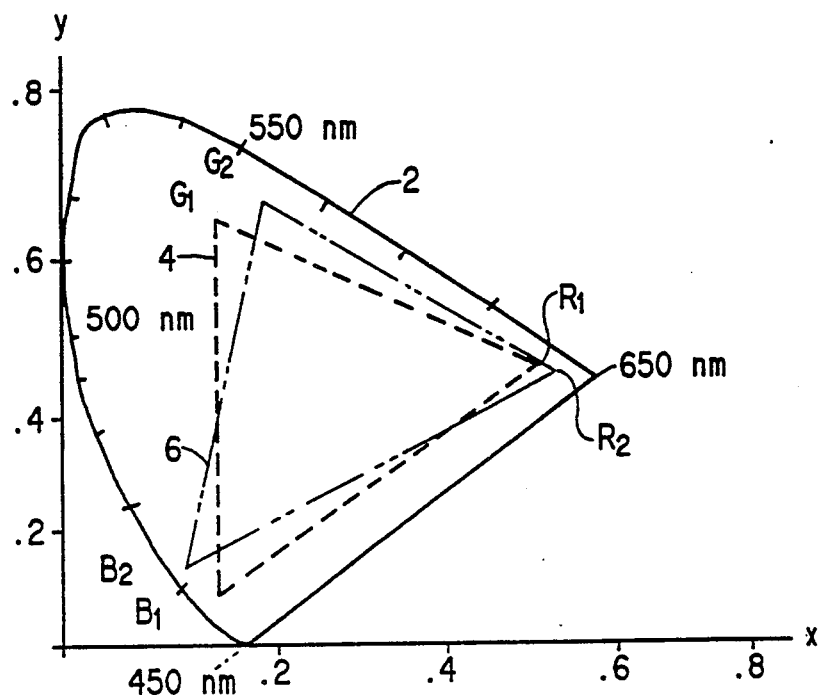
FIG. 1 shows a chromaticity diagram containing color gamuts of two different media, each having different $RGB_{(cie)}$ components.
Figure 2A:
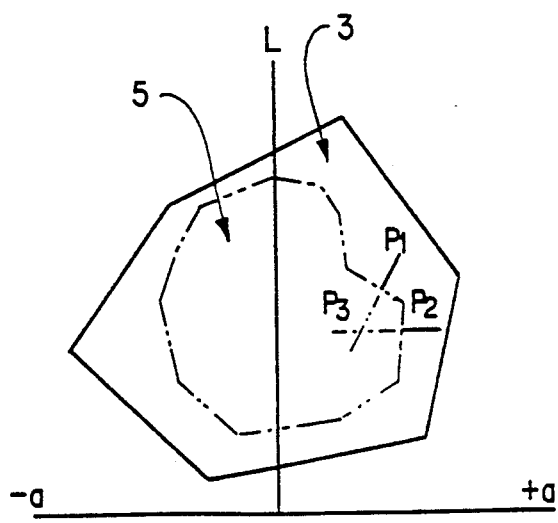
FIGS. 2(a) and 2(b) show two chromaticity diagrams in the Lab color space for $L=f(a)$ and $a=f(b)$ illustrating a prior art problem resulting from compressing color data points along the shortest path to the gamut envelope.
Figure 2B:
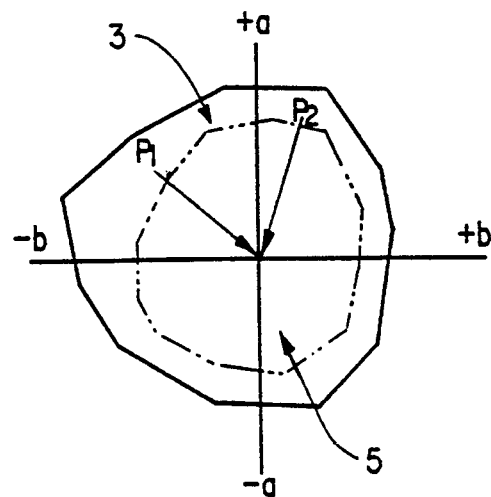

Throughout the following detailed description, similar reference characters refer to similar elements in all figures of the drawings.

Figure 3:
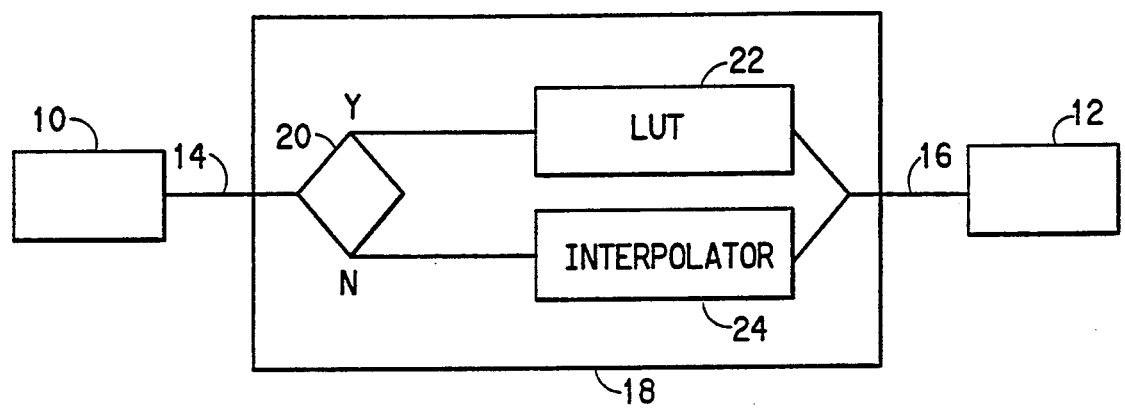
FIG. 3 shows a schematic arrangement of a device for implementing the method of the present invention.

Referring now to FIG. 3, there is shown a schematic representation of an apparatus for practicing the present invention. A source of color image information 10 supplies digital color data to an image reproduction device 12 over lines 14 and 16. An gamut adaptor 18 is interposed between the source of color image data 10 and the reproduction device 12. The adaptor 18 comprises a data receiving and determining means 20, a Look Up Table (LUT) 22 and an interpolator 24. The LUT 22 comprises a list of preselected color values in the color space of the device 12 and a corresponding list of derived color values also in the color space of the device 12. The receiving and determining means 20 receives color image data from the source 10 and determines whether there is in the LUT 22 a preselected color value equal to the input color value. If the LUT 22 includes such value, the corresponding derived value is identified and directed to the input of the device over line 16. If no preselected value equal to the input value is found in the LUT 22, the input value is directed to the interpolator 24, and a corresponding derived value is calculated by interpolation using data from the LUT 22. This interpolated derived value is then directed over line 16 to the input of the device 12.

The interpolation performed by the interpolator 24 may be tetrahedral interpolation performed through the use of a programmed computer. An appropriate program for programming such a computer to perform this interpolation for the case of a three variable system, i.e., RGB, is included with this application as appendix "A". A similar program for programming a computer for the case where four variables are used as color input values representing the usual inks employed in the graphic arts, i.e., YMCK, is also included with this application as appendix "B". Both are in the "C" language and appear immediately before the claims.

Interpolation may also be linear, (tri-linear or quadralinear depending on the number of variables in the color values), quadratic, or even higher order. The particular interpolation algorithm selected is not critical to this invention, and algorithm selection is a matter of choice, depending on the accuracy and ease of computation desired. In addition to the computer programs mentioned above, the following example of linear interpolation has been found to give adequate results.

The LUT 22 includes a preselected number of input values and corresponding derived values. Let Table I represent a small segment of this LUT 22 showing a set of preselected values for a system using 8 bit digital values to describe color. These values are data points along axes R, G, and B, in the color space of a color image reproduction device accepting an input in the RGB color space.

TABLE I $$\left. \begin{array}{l} R: \ldots, 76, 102, 128, 153 \ldots, \\ G: \ldots, 76, 102, 128, 153, \ldots, \\ B: \ldots, 76, 102, 128, 153, \ldots, \end{array} \right\} \text{Preselected values}$$

The data points representing preselected input values, are separated by a specified number of units representing a distance measured along each axis. Thus, the data points R=102 and R=128, are separated by a distance of 26 units along the R axis, while the data points G=128 and G=153 are separated by 25 units along the G axis. When an image is reproduced, the input values representing each picture element of the image may fall either on a data point or between data points. When it falls on a data point there is a derived value corresponding to the data point in the LUT 22. When it falls between data points, a derived value is calculated by interpolation.

The interpolation can be performed by letting $F_i$ be the ratio of the distance of the input value from a preceding data point along an axis to the distance between that preceding data point and the next consecutive data point along this axis. In this case where the color values have three components, i=0, 1, or 2 for R, G, and B, let $R_n$ be a data point along the R axis, $R_{n+1}$ be the next data point along this axis, and $R_1$ the R component value of a color input whose numerical value is $R_n < R_1 < R_{n+1}$. We have, $F_0 = (R_1 - R_n)/(R_{n+1} - R_n)$ for i=0. Similarly for i=1, $F_1 = (G_1 - G_n)/(G_{n+1} - G_n)$ and, for i=2, $F_2 = (B_1 - B_n)/(B_{n+1} - B_n)$.

We also define a quantity $Q_i = 1 - F_i$, and the set of coefficients $t_j$, where j=1, 2, ... 8, such that:

$$t_1 = F_0 * F_1 * F_2 \quad t_5 = Q_0 * Q_1 * F_2$$
$$t_2 = Q_0 * F_1 * F_2 \quad t_6 = Q_0 * F_1 * Q_2$$
$$t_3 = F_0 * Q_1 * F_2 \quad t_7 = F_0 * Q_1 * Q_2$$
$$t_4 = F_0 * F_1 * Q_2 \quad t_8 = Q_0 * Q_1 * Q_2$$

Let $R'(R_n, G_n, B_n)$, $G'(R_n, G_n, B_n)$, and $B'(R_n, G_n, B_n)$, represent the derived values for an input set of values $R_n$, $G_n$, and $B_n$; let $R'(R_{n+1}, G_n, B_n)$, $G'(R_{n+1}, G_n, B_n)$, and $B'(R_{n+1}, G_n, B_n)$ represent the derived values from the LUT 22 for an input set of values $R_{n+1}, G_n, B_n$; let $R'(R_n, G_{n+1}, B_n)$, $G'(R_n, G_{n+1}, B_n)$, and $B'(R_n, G_{n+1}, B_n)$ represent the derived values for an input set of values $R_n, G_{n+1}, B_n$; and let $R'(R_n, G_n, B_{n+1})$, $G'(R_n, G_n, B_{n+1})$, and $R'(R_n, G_n, B_{n+1})$ represent the derived values in the LUT 22 for an input set of $R_n, G_n, B_{n+1}$, and so on, for all combinations of input values $(R, G, B,)_n$ and $(R, G, B,)_{n+1}$.

The $R_1', G_1', B_1'$, derived values for an input set of color values $R_1, G_1, B_1$, falling between the $(R,G,B)_n$ and $(R,G,B)_{n+1}$ sets of preselected values in the LUT 22 are calculated by the following equations:

$$R' = t_1 * R'(R_{n+1}, G_{n+1}, B_{n+1}) + t_2 * R'(R_n, G_{n+1}, B_{n+1}) +$$
$$t_3 * R'(R_{n+1}, G_n, B_{n+1}) + t_4 * R'(R_{n+1}, G_{n+1}, B_n) +$$

-continued $$t_5 * R'(R_n, G_n, B_{n+1}) + t_6 * R'(R_n, G_{n+1}, B_n) +$$
$$t_7 * R'(R_{n+1}, G_n, B_n) + t_8 * R'(R_n, G_n, B_n)$$

$$G' = t_1 * G'(R_{n+1}, G_{n+1}, B_{n+1}) + t_2 * G'(R_n, G_{n+1}, B_{n+1}) +$$
$$t_3 * G'(R_{n+1}, G_n, B_{n+1}) + t_4 * G'(R_{n+1}, G_{n+1}, B_n) +$$
$$t_5 * G'(R_n, G_n, B_{n+1}) + t_6 * G'(R_n, G_{n+1}, B_n) +$$
$$t_7 * G'(R_{n+1}, G_n, B_n) + t_8 * G'(R_n, G_n, B_n)$$

and $$B' = t_1 * B'(R_{n+1}, G_{n+1}, B_{n+1}) + t_2 * B'(R_n, G_{n+1}, B_{n+1}) +$$
$$t_3 * B'(R_{n+1}, G_n, B_{n+1}) + t_4 * B'(R_{n+1}, G_{n+1}, B_n) +$$
$$t_5 * B'(R_n, G_n, B_{n+1}) + t_6 * B'(R_n, G_{n+1}, B_n) +$$
$$t_7 * B'(R_{n+1}, G_n, B_n) + t_8 * B'(R_n, G_n, B_n)$$

The construction of the LUT 22 involves the following process. First the two systems whose color gamuts are to be matched are identified. Let us as an example of two such systems consider two color printers from two different manufacturers. Our ultimate objective is to reproduce with printer No. 2 images that have been produced by printer No 1. We also want the images reproduced by the two systems to present a visual color match when viewed under similar conditions by an observer with normal vision.

Both printers accept 8 bit digital color image data in the RGB color space. That is, when three numerical values corresponding to the color components R,G,B are applied to each printer, the printers will print a picture element with a color represented by these values. The printers may include an internal converter for converting the RGB values to YMCK values for use with four color ink systems. For purposes of understanding the present invention, such internal conversion is not relevant.

In an 8 bit system the full gamut of input color is represented by 16,772,216 possible combinations of the three available component values R, G, and B which range from 0 to 255.

Both printer No. 1 and printer No. 2 will accept all 16,772,216 input combinations and will generate a color output for each of them. However, if the Red component of printer 1 and that of printer 2 are not the same when measured with a colorimeter and plotted on a chromaticity diagram, colors reproduced for the same RGB input by the two printers will not appear the same to the average observer under the same viewing conditions. This is intuitively predictable since two different reds are used in the reconstruction of a color. The intuitive prediction is explained by referring to the chromaticity diagram shown in FIG. 1. This Figure is a schematic representation of the of the CIEx,y chromaticity diagram showing the full color spectrum in a device independent color space. The co-ordinates "x" and "y" are related to the primary colors $RGB_{(cie)}$ through a well known relationship. See "Measuring Color" by R. W. G. Hunt, supra., pages 54 and 55.

Plotted in FIG. 1 are the gamuts of colors bounded by the dashed and dotted lines 4 and 6 that can be reproduced by two color reproduction devices, such as printers No. 1 and No. 2, respectfully, each having slightly different $RGB_{(cie)}$s. Two things become obvious—first that there are some colors that can be reproduced by one device, but not by the other (i.e., the colors represented by the area of one gamut which is not covered by the other gamut), and second that there are many colors that are possible to be reproduced with both devices, that is the colors (i.e., the colors represented by the area common to both gamuts). There are also a number of colors that cannot be reproduced by either device. However, this situation is of no interest in the practice of the present invention.

The LUT 22 that will be used in the gamut adaptor 18 must modify the incoming values so that: (a) for output colors that are within the common gamut area, the printers will produce the same colors, and (b) for colors that are outside the gamut of one device, the one printer will provide acceptable substitute colors for those produced by the other for the same input.

To construct the LUT 22, we begin by selecting a limited number of color values RGB such as shown in Table II.

TABLE II

R: 0 13 26 51 76 102 128 153 178 204 230 255
G: 0 13 26 51 76 102 128 153 178 204 230 255
B: 0 13 26 51 76 102 128 153 178 204 230 255

We apply the above values to both printers, and for each input set of color values we print a patch of that color. The two printed patches are measured with a colorimeter to obtain a colorimetric measure of the color in a device independent color space such as "Lab", for direct comparison. In this example where we are attempting to match the output of the printer No. 2 to reproduce images matching those produced by printer No. 1, we compare the "Lab" measured values from the printer No. 1 patch to those from the printer No. 2 patch. Should there be any difference in the two "Lab" values we next modify the RGB input to printer No. 2 and print another patch. Again we measure and compare the two printed patches in the "Lab" space to see if they are the same, and repeat this process until we find a set of derived $R_2G_2B_2$ values which when substituted in the input of printer No. 2 for an original set of RGB values, produce an output from printer No. 2 which is the same as the output produced when the RGB values are applied to printer No. 1. At that point we have achieved a color match, defined as two color patches whose colorimetrically measured color values in a colorimetric color space, such as "Lab", are the same.

This process is greatly facilitated, and the search for $(R_2,G_2,B_2)_n$ values corresponding to $(R,G,B)_n$ values which yield patches with identical "Lab" measured values is speeded up, by use of a process and associated equipment described in pending U.S. patent application Ser. No. 07/957,933 filed on Oct. 7, 1992 and U.S. patent application Ser. No. filed on Dec. 15, 1992 both assigned to the assignee of this patent application.

The use of the above process results in the identification of those $(RGB)_n$ values from Table II, for which $(R_2G_2B_2)_n$ values can be derived which produce patches with the Second printer that when compared to those produced by the $(RGB)_n$ input to the first printer are colorimetrically the same. These values correspond to values that are within the common gamut areas for the two printers in the chromaticity diagram of FIG. 1.

Since the two printers do not have identical color gamuts, there will be certain colors represented by sets of $(RGB)_n$ combinations for which there is no $(R_2G_2B_2)_n$ combination which will produce a color match, i.e., for which $(L-L_2, a-a_2,$ and $b-b_2)n=0$. What this means is that this particular color represented by an $(RGB)_n$ combination cannot be reproduced identically by the second printer.

All such $(RGB)_n$ combinations from Table II for which there are no derived values resulting in a color match are identified and $(R_2G_2B_2)_n$ derived values are obtained by extrapolation from adjacent color values in Table II for which there is a color match, as follows.

Figure 4A:
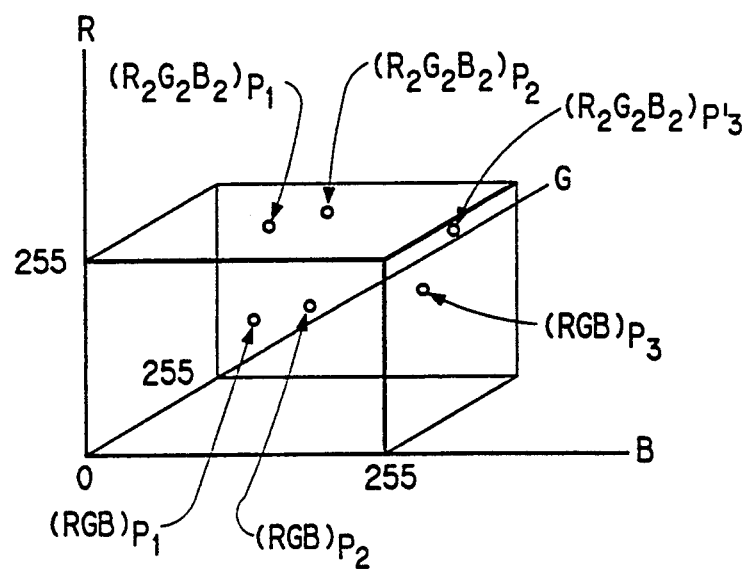
FIG. 4(a) shows the location of points, $(RGB)_{Pn}$ and derived $(R_2G_2B_2)_{Pn}$, within the gamut of two devices in a device dependent color space.
Figure 4B:
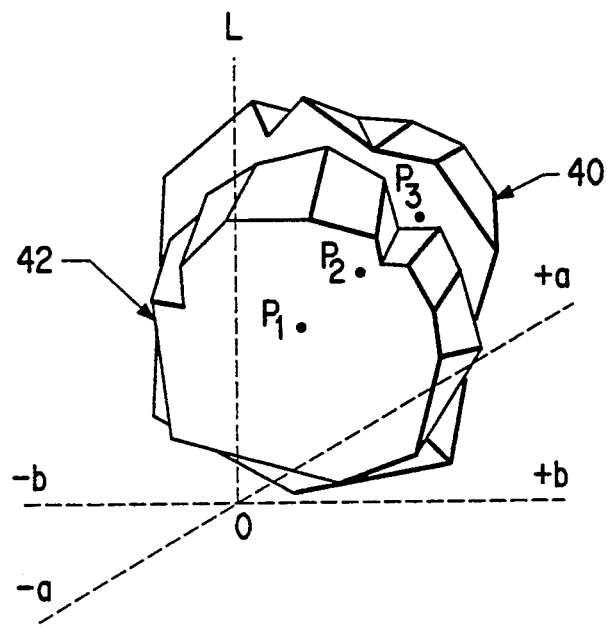
FIG. 4(b) shows the points Pn, corresponding to the points shown in FIG. 4(a), mapped on the gamuts of the same two devices in a device independent color space.

FIGS. 4(a) and 4(b) show the gamuts 40, 42 of an image reproduced by one printer and read by a scanner, and a second printer, respectively, which will be used to reproduce the image. The gamuts are shown in device dependent space (RGB) in FIG. 4(a) and device independent space "Lab" in FIG. 4(b). $P_1$ and $P_2$ are points within both gamuts, for which there is a set of derived $(R_2G_2B_2)_{P1}$, and $(R_2G_2B_2)_{P2}$ values corresponding to inputs $(RGB)_{P1}$ and $(RGB)_{P2}$. Point $P_3$ for set $(RGB)_{P3}$ is seen to fall outside the gamut of printer No. 2. Therefore, there is no set of derived values $(R_2G_2B_2)_{P3}$ for this point. Using the information available to us from the points $P_1$ and $P_2$, and if necessary from additional prior points, as will be discussed below, we derive by extrapolation a set of acceptable $(R'_2G'_2B'_2)_{P3}$ values lying somewhere between the closest point $P_2$ for which there is a set of $(R_2G_2B_2)_n$ (where n=2 in this example) values which results in an "Lab" set of values within the second printer gamut and the edge of the second printer gamut. The extrapolation is performed not in the "Lab" space, but in the device dependent "RGB" space.

In selecting the extrapolation method to be used, i.e., linear, quadratic, hyperbolic, etc., we run a series of subjective tests. The tests involve printing images typical of the type of image that one normally prints with a particular printer, and having a plurality of observers study the source image and the reproduced image side by side under similar illumination and background conditions. The images selected have a wide range of colors and shapes and the observer is asked to observe both images and state whether they appear the same (or acceptably similar) and whether there appears to be any noticeable loss of detail, or artifacts in the reproduced image. In reproducing the image, first linear extrapolation is tried, since such extrapolation is often adequate. Linear extrapolation has been found to work well in deriving values for use with printers using sublimeable dies, such as the 4Cast TM printer commercially available from E. I. du Pont de Nemours and Company. However, if a different reproduction system is used and the results obtained with linear extrapolation are unacceptable, a different, higher order, extrapolation algorithm is selected and the test repeated.

Figure 5:
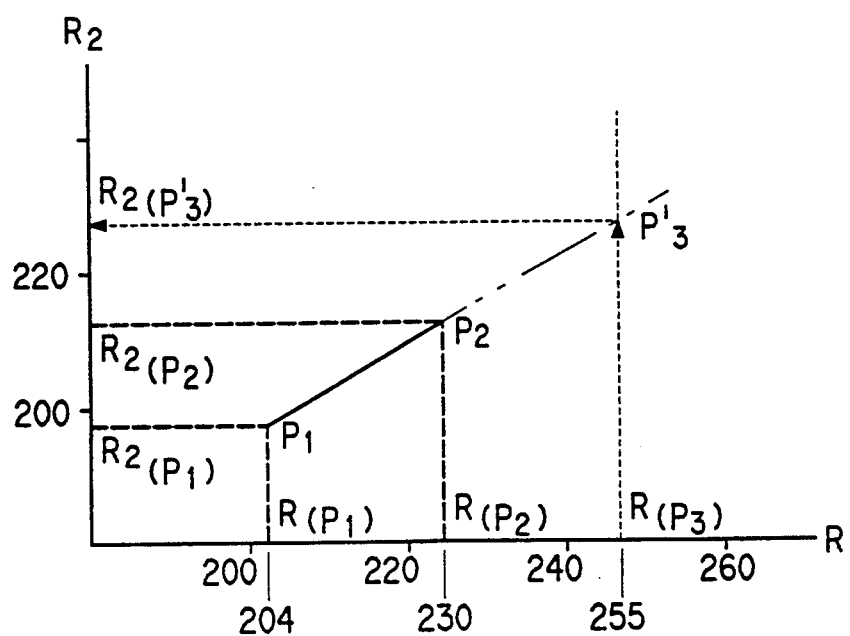
FIG. 5 shows a plot of derived $R_2$ values as a function of preselected input R values.
Figure 6:
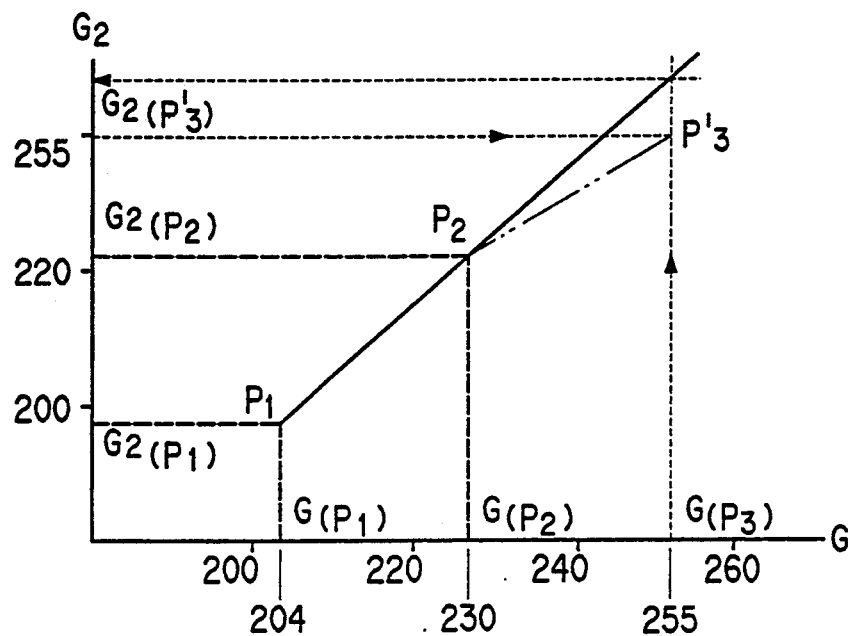
FIG. 6 shows a plot of derived $G_2$ values as a function of preselected input G values.
Figure 7:
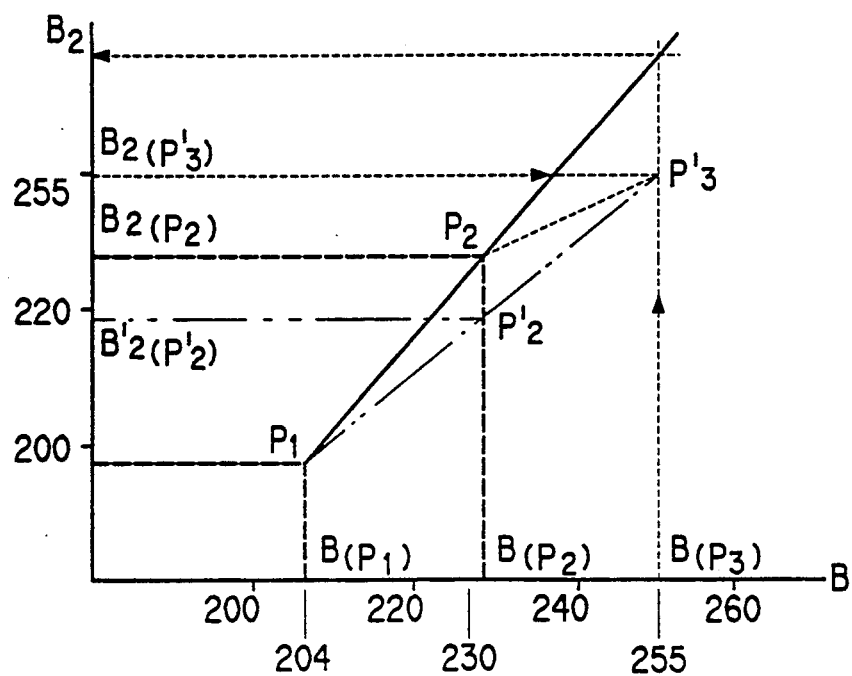
FIG. 7 shows a plot of derived $B_2$ values as a function of preselected input B values.

Linear extrapolation as used to derive sets of values for out of gamut input sets of values, is illustrated below together with FIGS. 5, 6 and 7, in an example illustrating graphical implementation of tri-linear extrapolation. Tri-linear extrapolation is used in this case where the input values are in the RGB color space, because there are three distinct variables in each set of values, R, G, and B, as shown in Table II. FIGS. 5, 6 and 7 represent the relationship between derived and input values for the three variables, i.e., $R_2$ as a function of R, $G_2$ as a function of G, and $B_2$ as a function of B. Points $P_1$, $P_2$, and $P_3$ are data points from Table 11. $P_1$, $P_2$, and $P_3$ are shown in FIG. 4(b). $P_3$ is a point falling outside the gamut of printer No. 2. $R'_2$, $G'_2$ and $R'_2$ values are therefore derived for $P_3$ as follows.

Referring to FIG. 5, points $P_1$ and $P_2$ are connected with a straight line, and the line extended beyond point $P_2$. A line is next drawn parallel to the $R_2$ axis from the R axis at a point corresponding to the R input value for $P_3$. From the intersection of this line and the extension of line $P_1-P_2$, a line parallel to the R axis is drawn intersecting the $R_2$ axis. The value at this intersection of the $R_2$ axis is the value used in the LUT as the derived $R'_2$ value corresponding to the out of gamut input R value.

The process is repeated for the set values G and B.

Depending on the slope of the line connecting points $P_1$ and $P_2$, it is possible to have a situation where the value found on the $R_2$, $G_2$, or $B_2$ axis is larger than 255, thus, non existent. FIG. 6 shows this situation where the extension of the line connecting points $P_1$ and $P_2$ results in a $G'_2$ derived value greater than 255. In this case, a point $P'_3$ is established with co-ordinates $G=255$ $G2=255$, and a line is drawn connecting $P_2$ to $P'_3$. This new $P_2-P'_3$ line is then used to derive $G_2$ values for input G values falling in the range of values exceeding $G_{(P2)}$.

FIG. 7 shows a different case where the slope of the line connecting points $P_2$ and $P'_3$ is very small. This translates in a small available value range for the out of gamut values. That is, the span between $B_2(P_2)$ and $B_2(P_3)$ is too small. In this instance, the extrapolation results in greatly compressing the out of gamut values. To avoid this problem, point $P_2$ is discarded, and a new line connecting point $P_1$ to point $P_3$ is drawn. New derived values are then calculated using this line, and even though there was originally a value $B_2(P_2)$ which resulted in an exact match when used with $B(P_2)$, a new derived value $B'_22(P'_2)$ is used, (even though it results in a slight mismatch) in order to provide a better overall match of all colors that fall outside the second printer gamut.

More than one or two adjacent points may be used, and the extrapolated line may be derived through linear or higher order regression. A computer implemented program for the calculation of derived values which has been found to give acceptable results for ink-jet type printers is included as Appendix C which is also written in the "C" language.

Those skilled in the art having the benefit of the teachings of the present invention as hereinabove set forth, can effect numerous modifications thereto. These modifications are to be construed as being encompassed within the scope of the present invention as set forth in the appended claims.

APPENDIX A

```
 1    /*************************************************************
 2
 3                         (c) Copyright 1992
 4              E. I. du Pont de Nemours and Company (Inc.)
 5                     Wilmington, Delaware 19898
 6
 7       Module:        clr3t.c
 8
 9       Purpose:       To transform a 3-channel digital image using
10                      Tetrahedral type interpolation.
11
12       Date Create:   July 9, 1992
13
14       Author:        C. B. Chittineni
15
16       Usage:         %cc -o clr3t clr3t.c -L/home/public/ipcb/ldip -ldip -lm
17                      %clr3t rgb_table rgb infile outfile
18
19              where   rgb_table.dat - Data for transformation in Liang's
20                                      convention
21                      rgb           - Dummy file name
22                      infile        - Input Image file name(Sun raster format)
23                      outfile       - Transformed image file name
24
25    *************************************************************/
26
27    #include <stdio.h>
28
29
30    short new[3];
31    int trin [3];
32    unsigned char *xbl,*ybl,*zbl;
33    unsigned char x[4096][8],y[4096][8],z[4096][8];
34
35    char header[768];
36
37
38    main(argc,argv)
39    int argc;
40    char *argv[];
41    {
```

```
42          struct rasterfile{
43            int ras_magic;
44            int ras_width;
45            int ras_height;
46            int ras_depth;
47            int ras_length;
48            int ras_type;
49            int ras_maptype;
50            int ras_maplength;
51          } header_ras;
52
53          int ff0, ff1;
54          int xx0, xx4;
55          short xx1, xx2, xx3;
56          register int i;
57          FILE * fopen(), *fcoe1,*fcoe2,*fpin, *fpout;
58          if(argc<3){
59          printf("usage:  lut ttalbe inf outf\n");
60          exit(0);
61          }
62          fcoe1=fopen(argv[1],"rb");
63          fpin=fopen(argv[3],"rb");
64          fpout=fopen(argv[4],"wb");
65
66          xbl=(unsigned char *)malloc(8);
67          ybl=(unsigned char *)malloc(8);
68          zbl=(unsigned char *)malloc(8);
69
70           fread(x[0],1,32768,fcoe1);
71           fread(y[0],1,32768,fcoe1);
72           fread(z[0],1,32768,fcoe1);
73
74  /* processing image */
75          fread(&header_ras, sizeof(header_ras), 1, fpin);
76          fwrite(&header_ras, sizeof(header_ras), 1, fpout);
77
78        for(;;){
79           trin[2]=(int)getc(fpin);
80           trin[1]=(int)getc(fpin);
81           trin[0]=(int)getc(fpin);
82           if(feof(fpin)) break;
83
84           xx4=0;
85       for (i = 0; i < 3; i++) {
86           xx0 = trin[i]>>4;
87           xx4 = xx4<<4 | xx0;
88       }
89           xx1 = trin[2]&15;
90           xx2 = trin[1]&15;
91           xx3 = trin[0]&15;
92
93           xbl=&x[xx4][0];
94           ybl=&y[xx4][0];
95           zbl=&z[xx4][0];
96
97
98
99  tr3us_t(3, 0, xx1, xx2, xx3, 16, xbl, ybl, zbl, new);
100
101
102          fputc(new[2],fpout);
103          fputc(new[1],fpout);
104          fputc(new[0],fpout);
105        }
106
107  free(xbl);
108  free(ybl);
109  free(zbl);
110
111  exit(0);
112
113  }
```

```
/****************************************************************

(c) Copyright 1992
        E. I. du Pont de Nemours and Company (Inc.)
              Wilmington, Delaware 19898.

Module:     tr3us_t.c

Purpose:    A function for tetrahedral type highspeed interpolation
                for performing 3 to 3 or 3 to n color coordinate
                conversions for the case of uniform sampling along
                coordinate axes. The vertices of the cube are
                numbered sequentially in a natural binary order
                (x3 x2 x1).

Author:     C. B. Chittineni

Date Create: June 1, 1992

Usage:      tr3us_t(n,ns,x1,x2,x3,l,x,y,z,val)

where  n  - no of outputs(int short)
              ns - total number of data sample points per output(int short)
              x1 - data point with in the cube along x1 axis(int short)
              x2 - data point with in the cube along x2 axis(int short)
              x3 - data point with in the cube along x3 axis(int short)
              l  - length of cube(int short)
              x  - data vector at current node(least rapidly varying)
                   (unsigned char)
              y  - data vector at current node(second least rapidly
                   varying) (unsigned char)
              z  - data vector at current node(most rapidly varying)
                   (unsigned char)
              val- pointer to interpolated values(n) (int short)

Modification:(Chittineni: July 9, 1992)Changed the vertex numbering
                as (n) -> (x y z)(0 - 1 1 1, 1 - 0 1 1, 2 - 1 0 1,
                3 - 0 0 1, 4 - 1 1 0, 5 - 0 1 0, 6 - 1 0 0,
                7 - 0 0 0)(Liang's data files format).

****************************************************************/ tr3us_t(n, ns, x1, x2, x3, l, x, y, z, new)
short new[3], n, ns, x1, x2, x3, l;
unsigned char *x, *y, *z;
{ int short w0, w1, w2, w3, a, b, c, d;
    int itm, j, j1, dt;
    int j2, j3, j4;
    unsigned char *x0, *y0, *z0;

itm=0;
    if(x2 >= x1){
        if(x3 >= x2){
            itm=3;
        }else if(x3 >= x1){
                itm=5;
            }else{
                itm=4;
            }
    }else if(x2>=x3){
            itm=0;
        }else if(x3 >= x1){
                itm=2;
            }else{
                itm=1;
            } switch (itm) {
```

```
            case 0:
                w0=(1-x1); w1=(x1-x2); w2=(x2-x3); w3=x3;
                new[0]=(w0*x[7]+w1*x[3]+w2*x[1]+w3*x[0])/l;
                new[1]=(w0*y[7]+w1*y[3]+w2*y[1]+w3*y[0])/l;
                new[2]=(w0*z[7]+w1*z[3]+w2*z[1]+w3*z[0])/l;
                break;

case 1:
                w0=(1-x1); w1=(x1-x3); w2=(x3-x2); w3=x2;
                new[0]=(w0*x[7]+w1*x[3]+w2*x[2]+w3*x[0])/l;
                new[1]=(w0*y[7]+w1*y[3]+w2*y[2]+w3*y[0])/l;
                new[2]=(w0*z[7]+w1*z[3]+w2*z[2]+w3*z[0])/l;
                break;

case 2:
                w0=(1-x3); w1=(x3-x1); w2=(x1-x2); w3=x2;
                new[0]=(w0*x[7]+w1*x[6]+w2*x[2]+w3*x[0])/l;
                new[1]=(w0*y[7]+w1*y[6]+w2*y[2]+w3*y[0])/l;
                new[2]=(w0*z[7]+w1*z[6]+w2*z[2]+w3*z[0])/l;
                break;

case 3:
                w0=(1-x3); w1=(x3-x2); w2=(x2-x1); w3=x1;
                new[0]=(w0*x[7]+w1*x[6]+w2*x[4]+w3*x[0])/l;
                new[1]=(w0*y[7]+w1*y[6]+w2*y[4]+w3*y[0])/l;
                new[2]=(w0*z[7]+w1*z[6]+w2*z[4]+w3*z[0])/l;
                break;

case 4:
                w0=(1-x2); w1=(x2-x1); w2=(x1-x3); w3=x3;
                new[0]=(w0*x[7]+w1*x[5]+w2*x[1]+w3*x[0])/l;
                new[1]=(w0*y[7]+w1*y[5]+w2*y[1]+w3*y[0])/l;
                new[2]=(w0*z[7]+w1*z[5]+w2*z[1]+w3*z[0])/l;
                break;

case 5:
                w0=(1-x2); w1=(x2-x3); w2=(x3-x1); w3=x1;
                new[0]=(w0*x[7]+w1*x[5]+w2*x[4]+w3*x[0])/l;
                new[1]=(w0*y[7]+w1*y[5]+w2*y[4]+w3*y[0])/l;
                new[2]=(w0*z[7]+w1*z[5]+w2*z[4]+w3*z[0])/l;
                break;

}
        return;
    }
```

APPENDIX B

```
/*******************************************************************

(c) Copyright 1992
        E. I. du Pont de Nemours and Company (Inc.)
              Wilmington, Delaware 19898

Module:     clr4t.c

Purpose:    To transform a 4-channel digital image using
                Tetrahedral type interpolation.

Date Create: July 9, 1992

Author:     C. B. Chittineni

Usage:      %cc -o clr4t clr4t.c -L/home/public/ipcb/ldip -ldip -lm
                %clr4t rgb_table.dat rgb infile outfile where   rgb_table.dat - Data for transformation in Liang's
                                convention
                rgb - Dummy file name
                infile - Input Image file name(Sun raster format)
                outfile - Transformed image file name

********************************************************************/
```

```
include <stdio.h> short new[4];
int trin [4];
unsigned char *ybl,*mbl,*cbl,*kbl;
unsigned char y[65536][16],m[65536][16],c[65536][16],k[65536][16];

char header[768];

main(argc,argv)
int argc;
char *argv[];
{
        struct rasterfile{
          int ras_magic;
          int ras_width;
          int ras_height;
          int ras_depth;
          int ras_length;
          int ras_type;
          int ras_maptype;
          int ras_maplength;
        } header_ras;

int ff0, ff1;
        int  xx4;
        short xx0, xx1, xx2, xx3;
        register int i;
        FILE * fopen(), *fcoe1,*fcoe2,*fpin, *fpout;
        if(argc<3){
        printf("usage:   lut ttalbe inf outf\n");
        exit(0);
        }
        fcoe1=fopen(argv[1],"rb");
   /*   fcoe2=fopen(argv[2],"rb");*/
        fpin=fopen(argv[3],"rb");
        fpout=fopen(argv[4],"wb");

ybl=(unsigned char *)malloc(16);
        mbl=(unsigned char *)malloc(16);
        cbl=(unsigned char *)malloc(16);
        kbl=(unsigned char *)malloc(16);

fread(y[0],1,1048576,fcoe1);
         fread(m[0],1,1048576,fcoe1);
         fread(c[0],1,1048576,fcoe1);
         fread(k[0],1,1048576,fcoe1);

fread(&header_ras, sizeof(header_ras), 1, fpin);
        fwrite(&header_ras, sizeof(header_ras), 1, fpout);

for(;;){
          trin[2]=(int)getc(fpin);
          trin[1]=(int)getc(fpin);
          trin[0]=(int)getc(fpin);
          trin[3]=(int)getc(fpin);
          if(feof(fpin)) break;

xx4=0;
      for (i = 0; i < 4; i++) {
         xx0 = trin[i]>>4;
         xx4 = xx4<<4 | xx0;
      }
         xx0 = trin[0]&15;
         xx1 = trin[1]&15;
         xx2 = trin[2]&15;
         xx3 = trin[3]&15;

ybl=&y[xx4][0];
```

```
 98             mbl=&m[xx4][0];
 99             cbl=&c[xx4][0];
100             kbl=&k[xx4][0];
101
102
103
104     tr4us_t(4, 0, xx0, xx1, xx2, xx3, 16, cbl, mbl, ybl, kbl, new);
105
106
107             fputc(new[0],fpout);
108             fputc(new[1],fpout);
109             fputc(new[2],fpout);
110             fputc(new[3],fpout);
111         }
112
113         exit(0);
114
115     }
116     /***************************************************************
117
118                         (c) Copyright 1992
119             E. I. du Pont de Nemours and Company (Inc.)
120                   Wilmington, Delaware 19898.
121
122     Module:      tr4us_t.c
123
124     Purpose:     A function for tetrahedral type highspeed interpolation
125                  for performing 4 to 4 or 4 to n color coordinate
126                  conversions for the case of uniform sampling along
127                  coordinate axes. The vertices of the hypercube are
128                  numbered sequentially in a binary order (x1 x2 x3 x4).
129                  It is to be noted that the ordering is important
130                  in arranging the sampled data and in passing the
131                  arguments to the function.
132
133     Author:      C. B. Chittineni
134
135     Date Create: June 1, 1992
136
137     Usage:       tr4us_t(n,ns,x1,x2,x3,x4,l,cbl,mbl,ybl,kbl,val)
138
139         where  n  - no of outputs(int short)
140                ns - total number of data sample points per output(int)
141                x1 - data point with in the hypercube along x1 axis(int short)
142                x2 - data point with in the hypercube along x2 axis(int short)
143                x3 - data point with in the hypercube along x3 axis(int short)
144                x4 - data point with in the hypercube along x4 axis(int short)
145                l  - length of hypercube(int short)
146                cbl- data vector at current node(least rapidly varying)
147                     (unsigned char)
148                mbl- data vector at current node(second least rapidly varying)
149                     (unsigned char)
150                ybl- data vector at current node(third least rapidly varying)
151                     (unsigned char)
152                kbl- data vector at current node(most rapidly varying)
153                     (unsigned char)
154                val- pointer to interpolated values(n)(int short)
155
156     Modification:(Chittineni:July 9, 1992)Changed the vertex numbering
157                  as (n) -> (cbl mbl ybl kbl)(0 - 1 1 1 1, 1 - 0 1 1 1,
158                  2 - 1 0 1 1, 3 - 1 1 0 1, 4 - 1 1 1 0, 5 - 0 0 1 1,
159                  6 - 0 1 0 1, 7 - 0 1 1 0, 8 - 1 0 0 1, 9 - 1 0 1 0,
160                  10- 1 1 0 0,11 - 1 0 0 0,12 - 0 1 0 0,13 - 0 0 1 0,
161                  14- 0 0 0 1,15 - 0 0 0 0)(Liang's data format).
162
163     ***************************************************************/
164
165     #include <stdio.h>
166     #include <math.h>
167     tr4us_t(n, ns, x1, x2, x3, x4, l, cbl, mbl, ybl, kbl, new)
168     int short n, x1, x2, x3, x4, l;
169     int short *new;
```

```
170   int ns;
171   unsigned char *cbl, *mbl, *ybl, *kbl;
172   {
173
174       int short w0, w1, w2, w3, w4, a, b, c, d, e;
175       int itm, j, j1, j2;
176
177       /* Locate the tetrahedran */
178       if(x1 >= x2){
179           if(x2 >= x3){
180               if(x3 >= x4){
181                   itm=1;
182               }else if(x1 >= x4){
183                   if(x2 >= x4){
184                       itm=2;
185                   }else{
186                       itm=3;
187                   }
188               }else {
189                   itm=19;
190               }
191           }else if(x3 >= x4){
192               if(x1>=x4){
193                   if(x2>=x4){
194                       if(x1>=x3){
195                           itm=5;
196                       }else{
197                           itm=13;
198                       }
199                   }else if(x1 >= x3){
200                       itm=6;
201                   }else{
202                       itm=14;
203                   }
204               }else{
205                   itm=15;
206               }
207           }else if(x1 >= x4){
208               itm=4;
209           }else if(x1 >= x3){
210               itm=20;
211           }else {
212               itm=21;
213           }
214       }else if(x2 >= x3){
215           if(x3 >= x4){
216               if(x1 >= x4){
217                   if(x1 >= x3){
218                       itm=7;
219                   }else {
220                       itm=11;
221                   }
222               }else{
223                   itm=12;
224               }
225           }else if(x1 >= x4){
226               itm=8;
227           }else if(x2 >= x4){
228               if(x1 >= x3){
229                   itm=9;
230               }else{
231                   itm=10;
232               }
233           }else if(x1 >= x3){
234               itm=23;
235           }else{
236               itm=24;
237           }
238       }else if(x3 >= x4){
239           if(x1 >= x4){
240               itm=17;
241           }else if(x2 >= x4){
```

```
                            itm=18;
                        }else{
                            itm=16;
                        }
                }else{
                    itm=22;
                }

/*              fprintf(stderr, "%d \n", itm);*/ switch (itm) { case 1:
          w0=(1-x1); w1=(x1-x2); w2=(x2-x3); w3=(x3-x4); w4=x4;
          new[0]=(w0*cbl[15]+w1*cbl[11]+w2*cbl[10]+w3*cbl[4]+w4*cbl[0])/l;
          new[1]=(w0*mbl[15]+w1*mbl[11]+w2*mbl[10]+w3*mbl[4]+w4*mbl[0])/l;
          new[2]=(w0*ybl[15]+w1*ybl[11]+w2*ybl[10]+w3*ybl[4]+w4*ybl[0])/l;
          new[3]=(w0*kbl[15]+w1*kbl[11]+w2*kbl[10]+w3*kbl[4]+w4*kbl[0])/l;
          break;

case 2:
          w0=(1-x1); w1=(x1-x2); w2=(x2-x4); w3=(x4-x3); w4=x3;
          new[0]=(w0*cbl[15]+w1*cbl[11]+w2*cbl[10]+w3*cbl[3]+w4*cbl[0])/l;
          new[1]=(w0*mbl[15]+w1*mbl[11]+w2*mbl[10]+w3*mbl[3]+w4*mbl[0])/l;
          new[2]=(w0*ybl[15]+w1*ybl[11]+w2*ybl[10]+w3*ybl[3]+w4*ybl[0])/l;
          new[3]=(w0*kbl[15]+w1*kbl[11]+w2*kbl[10]+w3*kbl[3]+w4*kbl[0])/l;
          break;

case 3:
          w0=(1-x1); w1=(x1-x4); w2=(x4-x2); w3=(x2-x3); w4=x3;
          new[0]=(w0*cbl[15]+w1*cbl[11]+w2*cbl[8]+w3*cbl[3]+w4*cbl[0])/l;
          new[1]=(w0*mbl[15]+w1*mbl[11]+w2*mbl[8]+w3*mbl[3]+w4*mbl[0])/l;
          new[2]=(w0*ybl[15]+w1*ybl[11]+w2*ybl[8]+w3*ybl[3]+w4*ybl[0])/l;
          new[3]=(w0*kbl[15]+w1*kbl[11]+w2*kbl[8]+w3*kbl[3]+w4*kbl[0])/l;
          break;

case 4:
          w0=(1-x1); w1=(x1-x4); w2=(x4-x3); w3=(x3-x2); w4=x2;
          new[0]=(w0*cbl[15]+w1*cbl[11]+w2*cbl[8]+w3*cbl[2]+w4*cbl[0])/l;
          new[1]=(w0*mbl[15]+w1*mbl[11]+w2*mbl[8]+w3*mbl[2]+w4*mbl[0])/l;
          new[2]=(w0*ybl[15]+w1*ybl[11]+w2*ybl[8]+w3*ybl[2]+w4*ybl[0])/l;
          new[3]=(w0*kbl[15]+w1*kbl[11]+w2*kbl[8]+w3*kbl[2]+w4*kbl[0])/l;
          break;

case 5:
          w0=(1-x1); w1=(x1-x3); w2=(x3-x2); w3=(x2-x4); w4=x4;
          new[0]=(w0*cbl[15]+w1*cbl[11]+w2*cbl[9]+w3*cbl[4]+w4*cbl[0])/l;
          new[1]=(w0*mbl[15]+w1*mbl[11]+w2*mbl[9]+w3*mbl[4]+w4*mbl[0])/l;
          new[2]=(w0*ybl[15]+w1*ybl[11]+w2*ybl[9]+w3*ybl[4]+w4*ybl[0])/l;
          new[3]=(w0*kbl[15]+w1*kbl[11]+w2*kbl[9]+w3*kbl[4]+w4*kbl[0])/l;
          break;

case 6:
          w0=(1-x1); w1=(x1-x3); w2=(x3-x4); w3=(x4-x2); w4=x2;
          new[0]=(w0*cbl[15]+w1*cbl[11]+w2*cbl[9]+w3*cbl[2]+w4*cbl[0])/l;
          new[1]=(w0*mbl[15]+w1*mbl[11]+w2*mbl[9]+w3*mbl[2]+w4*mbl[0])/l;
          new[2]=(w0*ybl[15]+w1*ybl[11]+w2*ybl[9]+w3*ybl[2]+w4*ybl[0])/l;
          new[3]=(w0*kbl[15]+w1*kbl[11]+w2*kbl[9]+w3*kbl[2]+w4*kbl[0])/l;
          break;

case 7:
          w0=(1-x2); w1=(x2-x1); w2=(x1-x3); w3=(x3-x4); w4=x4;
          new[0]=(w0*cbl[15]+w1*cbl[12]+w2*cbl[10]+w3*cbl[4]+w4*cbl[0])/l;
          new[1]=(w0*mbl[15]+w1*mbl[12]+w2*mbl[10]+w3*mbl[4]+w4*mbl[0])/l;
          new[2]=(w0*ybl[15]+w1*ybl[12]+w2*ybl[10]+w3*ybl[4]+w4*ybl[0])/l;
          new[3]=(w0*kbl[15]+w1*kbl[12]+w2*kbl[10]+w3*kbl[4]+w4*kbl[0])/l;
          break;

case 8:
          w0=(1-x2); w1=(x2-x1); w2=(x1-x4); w3=(x4-x3); w4=x3;
          new[0]=(w0*cbl[15]+w1*cbl[12]+w2*cbl[10]+w3*cbl[3]+w4*cbl[0])/l;
          new[1]=(w0*mbl[15]+w1*mbl[12]+w2*mbl[10]+w3*mbl[3]+w4*mbl[0])/l;
```

```
        new[2]=(w0*ybl[15]+w1*ybl[12]+w2*ybl[10]+w3*ybl[3]+w4*ybl[0])/l;
        new[3]=(w0*kbl[15]+w1*kbl[12]+w2*kbl[10]+w3*kbl[3]+w4*kbl[0])/l;
        break;

case 9:
        w0=(1-x2); w1=(x2-x4); w2=(x4-x1); w3=(x1-x3); w4=x3;
        new[0]=(w0*cbl[15]+w1*cbl[12]+w2*cbl[6]+w3*cbl[3]+w4*cbl[0])/l;
        new[1]=(w0*mbl[15]+w1*mbl[12]+w2*mbl[6]+w3*mbl[3]+w4*mbl[0])/l;
        new[2]=(w0*ybl[15]+w1*ybl[12]+w2*ybl[6]+w3*ybl[3]+w4*ybl[0])/l;
        new[3]=(w0*kbl[15]+w1*kbl[12]+w2*kbl[6]+w3*kbl[3]+w4*kbl[0])/l;
        break;

case 10:
        w0=(1-x2); w1=(x2-x4); w2=(x4-x3); w3=(x3-x1); w4=x1;
        new[0]=(w0*cbl[15]+w1*cbl[12]+w2*cbl[6]+w3*cbl[1]+w4*cbl[0])/l;
        new[1]=(w0*mbl[15]+w1*mbl[12]+w2*mbl[6]+w3*mbl[1]+w4*mbl[0])/l;
        new[2]=(w0*ybl[15]+w1*ybl[12]+w2*ybl[6]+w3*ybl[1]+w4*ybl[0])/l;
        new[3]=(w0*kbl[15]+w1*kbl[12]+w2*kbl[6]+w3*kbl[1]+w4*kbl[0])/l;
        break;

case 11:
        w0=(1-x2); w1=(x2-x3); w2=(x3-x1); w3=(x1-x4); w4=x4;
        new[0]=(w0*cbl[15]+w1*cbl[12]+w2*cbl[7]+w3*cbl[4]+w4*cbl[0])/l;
        new[1]=(w0*mbl[15]+w1*mbl[12]+w2*mbl[7]+w3*mbl[4]+w4*mbl[0])/l;
        new[2]=(w0*ybl[15]+w1*ybl[12]+w2*ybl[7]+w3*ybl[4]+w4*ybl[0])/l;
        new[3]=(w0*kbl[15]+w1*kbl[12]+w2*kbl[7]+w3*kbl[4]+w4*kbl[0])/l;
        break;

case 12:
        w0=(1-x2); w1=(x2-x3); w2=(x3-x4); w3=(x4-x1); w4=x1;
        new[0]=(w0*cbl[15]+w1*cbl[12]+w2*cbl[7]+w3*cbl[1]+w4*cbl[0])/l;
        new[1]=(w0*mbl[15]+w1*mbl[12]+w2*mbl[7]+w3*mbl[1]+w4*mbl[0])/l;
        new[2]=(w0*ybl[15]+w1*ybl[12]+w2*ybl[7]+w3*ybl[1]+w4*ybl[0])/l;
        new[3]=(w0*kbl[15]+w1*kbl[12]+w2*kbl[7]+w3*kbl[1]+w4*kbl[0])/l;
        break;

case 13:
        w0=(1-x3); w1=(x3-x1); w2=(x1-x2); w3=(x2-x4); w4=x4;
        new[0]=(w0*cbl[15]+w1*cbl[13]+w2*cbl[9]+w3*cbl[4]+w4*cbl[0])/l;
        new[1]=(w0*mbl[15]+w1*mbl[13]+w2*mbl[9]+w3*mbl[4]+w4*mbl[0])/l;
        new[2]=(w0*ybl[15]+w1*ybl[13]+w2*ybl[9]+w3*ybl[4]+w4*ybl[0])/l;
        new[3]=(w0*kbl[15]+w1*kbl[13]+w2*kbl[9]+w3*kbl[4]+w4*kbl[0])/l;
        break;

case 14:
        w0=(1-x3); w1=(x3-x1); w2=(x1-x4); w3=(x4-x2); w4=x2;
        new[0]=(w0*cbl[15]+w1*cbl[13]+w2*cbl[9]+w3*cbl[2]+w4*cbl[0])/l;
        new[1]=(w0*mbl[15]+w1*mbl[13]+w2*mbl[9]+w3*mbl[2]+w4*mbl[0])/l;
        new[2]=(w0*ybl[15]+w1*ybl[13]+w2*ybl[9]+w3*ybl[2]+w4*ybl[0])/l;
        new[3]=(w0*kbl[15]+w1*kbl[13]+w2*kbl[9]+w3*kbl[2]+w4*kbl[0])/l;
        break;

case 15:
        w0=(1-x3); w1=(x3-x4); w2=(x4-x1); w3=(x1-x2); w4=x2;
        new[0]=(w0*cbl[15]+w1*cbl[13]+w2*cbl[5]+w3*cbl[2]+w4*cbl[0])/l;
        new[1]=(w0*mbl[15]+w1*mbl[13]+w2*mbl[5]+w3*mbl[2]+w4*mbl[0])/l;
        new[2]=(w0*ybl[15]+w1*ybl[13]+w2*ybl[5]+w3*ybl[2]+w4*ybl[0])/l;
        new[3]=(w0*kbl[15]+w1*kbl[13]+w2*kbl[5]+w3*kbl[2]+w4*kbl[0])/l;
        break;

case 16:
        w0=(1-x3); w1=(x3-x4); w2=(x4-x2); w3=(x2-x1); w4=x1;
        new[0]=(w0*cbl[15]+w1*cbl[13]+w2*cbl[5]+w3*cbl[1]+w4*cbl[0])/l;
        new[1]=(w0*mbl[15]+w1*mbl[13]+w2*mbl[5]+w3*mbl[1]+w4*mbl[0])/l;
        new[2]=(w0*ybl[15]+w1*ybl[13]+w2*ybl[5]+w3*ybl[1]+w4*ybl[0])/l;
        new[3]=(w0*kbl[15]+w1*kbl[13]+w2*kbl[5]+w3*kbl[1]+w4*kbl[0])/l;
        break;

case 17:
        w0=(1-x3); w1=(x3-x2); w2=(x2-x1); w3=(x1-x4); w4=x4;
        new[0]=(w0*cbl[15]+w1*cbl[13]+w2*cbl[7]+w3*cbl[4]+w4*cbl[0])/l;
        new[1]=(w0*mbl[15]+w1*mbl[13]+w2*mbl[7]+w3*mbl[4]+w4*mbl[0])/l;
```

```
386              new[2]=(w0*ybl[15]+w1*ybl[13]+w2*ybl[7]+w3*ybl[4]+w4*ybl[0])/l;
387              new[3]=(w0*kbl[15]+w1*kbl[13]+w2*kbl[7]+w3*kbl[4]+w4*kbl[0])/l;
388              break;
389
390         case 18:
391              w0=(1-x3); w1=(x3-x2); w2=(x2-x4); w3=(x4-x1); w4=x1;
392              new[0]=(w0*cbl[15]+w1*cbl[13]+w2*cbl[7]+w3*cbl[1]+w4*cbl[0])/l;
393              new[1]=(w0*mbl[15]+w1*mbl[13]+w2*mbl[7]+w3*mbl[1]+w4*mbl[0])/l;
394              new[2]=(w0*ybl[15]+w1*ybl[13]+w2*ybl[7]+w3*ybl[1]+w4*ybl[0])/l;
395              new[3]=(w0*kbl[15]+w1*kbl[13]+w2*kbl[7]+w3*kbl[1]+w4*kbl[0])/l;
396              break;
397
398         case 19:
399              w0=(1-x4); w1=(x4-x1); w2=(x1-x2); w3=(x2-x3); w4=x3;
400              new[0]=(w0*cbl[15]+w1*cbl[14]+w2*cbl[8]+w3*cbl[3]+w4*cbl[0])/l;
401              new[1]=(w0*mbl[15]+w1*mbl[14]+w2*mbl[8]+w3*mbl[3]+w4*mbl[0])/l;
402              new[2]=(w0*ybl[15]+w1*ybl[14]+w2*ybl[8]+w3*ybl[3]+w4*ybl[0])/l;
403              new[3]=(w0*kbl[15]+w1*kbl[14]+w2*kbl[8]+w3*kbl[3]+w4*kbl[0])/l;
404              break;
405
406         case 20:
407              w0=(1-x4); w1=(x4-x1); w2=(x1-x3); w3=(x3-x2); w4=x2;
408              new[0]=(w0*cbl[15]+w1*cbl[14]+w2*cbl[8]+w3*cbl[2]+w4*cbl[0])/l;
409              new[1]=(w0*mbl[15]+w1*mbl[14]+w2*mbl[8]+w3*mbl[2]+w4*mbl[0])/l;
410              new[2]=(w0*ybl[15]+w1*ybl[14]+w2*ybl[8]+w3*ybl[2]+w4*ybl[0])/l;
411              new[3]=(w0*kbl[15]+w1*kbl[14]+w2*kbl[8]+w3*kbl[2]+w4*kbl[0])/l;
412              break;
413
414         case 21:
415              w0=(1-x4); w1=(x4-x3); w2=(x3-x1); w3=(x1-x2); w4=x2;
416              new[0]=(w0*cbl[15]+w1*cbl[14]+w2*cbl[5]+w3*cbl[2]+w4*cbl[0])/l;
417              new[1]=(w0*mbl[15]+w1*mbl[14]+w2*mbl[5]+w3*mbl[2]+w4*mbl[0])/l;
418              new[2]=(w0*ybl[15]+w1*ybl[14]+w2*ybl[5]+w3*ybl[2]+w4*ybl[0])/l;
419              new[3]=(w0*kbl[15]+w1*kbl[14]+w2*kbl[5]+w3*kbl[2]+w4*kbl[0])/l;
420              break;
421
422         case 22:
423              w0=(1-x4); w1=(x4-x3); w2=(x3-x2); w3=(x2-x1); w4=x1;
424              new[0]=(w0*cbl[15]+w1*cbl[14]+w2*cbl[5]+w3*cbl[1]+w4*cbl[0])/l;
425              new[1]=(w0*mbl[15]+w1*mbl[14]+w2*mbl[5]+w3*mbl[1]+w4*mbl[0])/l;
426              new[2]=(w0*ybl[15]+w1*ybl[14]+w2*ybl[5]+w3*ybl[1]+w4*ybl[0])/l;
427              new[3]=(w0*kbl[15]+w1*kbl[14]+w2*kbl[5]+w3*kbl[1]+w4*kbl[0])/l;
428              break;
429
430         case 23:
431              w0=(1-x4); w1=(x4-x2); w2=(x2-x1); w3=(x1-x3); w4=x3;
432              new[0]=(w0*cbl[15]+w1*cbl[14]+w2*cbl[6]+w3*cbl[3]+w4*cbl[0])/l;
433              new[1]=(w0*mbl[15]+w1*mbl[14]+w2*mbl[6]+w3*mbl[3]+w4*mbl[0])/l;
434              new[2]=(w0*ybl[15]+w1*ybl[14]+w2*ybl[6]+w3*ybl[3]+w4*ybl[0])/l;
435              new[3]=(w0*kbl[15]+w1*kbl[14]+w2*kbl[6]+w3*kbl[3]+w4*kbl[0])/l;
436              break;
437
438         case 24:
439              w0=(1-x4); w1=(x4-x2); w2=(x2-x3); w3=(x3-x1); w4=x1;
440              new[0]=(w0*cbl[15]+w1*cbl[14]+w2*cbl[6]+w3*cbl[1]+w4*cbl[0])/l;
441              new[1]=(w0*mbl[15]+w1*mbl[14]+w2*mbl[6]+w3*mbl[1]+w4*mbl[0])/l;
442              new[2]=(w0*ybl[15]+w1*ybl[14]+w2*ybl[6]+w3*ybl[1]+w4*ybl[0])/l;
443              new[3]=(w0*kbl[15]+w1*kbl[14]+w2*kbl[6]+w3*kbl[1]+w4*kbl[0])/l;
444              break;
445
446         }
447
448         return;
449
450    }
```

APPENDIX C

```
1    /*****************************************************************
2
3                      (c) Copyright 1992
4            E. I. du Pont de Nemours and Company (Inc.)
5                   Wilmington, Delaware 19898
```

```
      Module:     lsfit.c

Purpose:    To do two-dimensional least square fitting

Description: lsfit2d is a 2-D linear regression module where
                  zz is the function of x and y, w is the weighting
                  function, n is the number of samples and bb is
                  the coefficient matrix.
                  lsfit2d2 is a 2-D 2nd order polynomial regression
                  module.
                  In order to use these porgram, header files disk.h
                  and matrix.h have to be included. All functions of
                  matrix calculation are defined in file matrix.c.
                  Files disk.h, matrix.h and matrix.c can be found in
                  Paul M. Embree and Bruce Kimble's book:" C Language
                  Algorithms For Digital Signal Processing",Prentice
                  Hall,1991.

Date Create: March 19, 1992

Author:     Zhongjie Liang

***************************************************************/ lsfit2d(x,y,zz,w,n,bb)
int n;
float *x,*y,*zz,*w;
float *bb;
{

MATRIX *At,*B,*At_Ai_At,*Z;
    int i,j;
    double **at,**b,**z;

/* weighted powers of x matrix transpose = At */

At = matrix_allocate(3,n,sizeof(double));
    at = (double **) At->ptr;

for(i = 0 ; i < n ; i++) {
        at[0][i] = w[i];
        at[1][i] = w[i] * x[i];
        at[2][i] = w[i] * y[i];
    }

/* Z = weighted y vector */
    Z = matrix_allocate(n,1,sizeof(double));
    z = (double **) Z->ptr;

for(i = 0 ; i < n ; i++) z[i][0] = w[i] * zz[i];

At_Ai_At = matrix_mult(matrix_invert(matrix_mult(At,
                        matrix_transpose(At))),At);

B = matrix_mult(At_Ai_At,Z);

b = (double **)B->ptr;

for(i=0; i<3; i++) bb[i]=(float)b[i][0];

}

/*++++++++++++++++++++++++++*/ lsfit2d2(x,y,zz,w,n,bb)
int n;
float *x,*y,*zz,*w;
float *bb;
```

```
78   {
79
80       MATRIX *At,*B,*At_Ai_At,*Z;
81       int i,j;
82       double **at,**b,**z;
83
84   /* weighted powers of x matrix transpose - At */
85
86       At = matrix_allocate(6,n,sizeof(double));
87       at = (double **) At->ptr;
88
89       for(i = 0 ; i < n ; i++) {
90           at[0][i] = w[i];
91           at[1][i] = w[i] * x[i];
92           at[2][i] = w[i] * y[i];
93           at[3][i] = w[i] * x[i]*x[i];
94           at[4][i] = w[i] * x[i]*y[i];
95           at[5][i] = w[i] * y[i]*y[i];
96       }
97
98
99
100  /* Z = weighted y vector */
101      Z = matrix_allocate(n,1,sizeof(double));
102      z = (double **) Z->ptr;
103
104      for(i = 0 ; i < n ; i++) z[i][0] = w[i] * zz[i];
105
106      At_Ai_At = matrix_mult(matrix_invert(matrix_mult(At,
107                             matrix_transpose(At))),At);
108
109      B = matrix_mult(At_Ai_At,Z);
110
111
112      b = (double **)B->ptr;
113
114      FOR(I=0; i<6; i++) bb[i]=(float)b[i][0];
115
116  }
```

What is claimed is:

1. A method for reproducing a color image having color values in a first color gamut with a device able to reproduce color values representing a second color gamut wherein the first color gamut includes color values outside the second color gamut, the first and second color gamuts being defined in a device independent color space, comprising the steps of:

(1) creating a LUT comprising a first preselected plurality of color values from the first color gamut, and a corresponding second plurality of derived color values, wherein (a) for each one of the first plurality of color values for which there is a corresponding color value in said second color gamut, the corresponding derived color value is calculated to reproduce through the device a color having a same colorimetric measure in a device independent color space as the color represented by the one of the first plurality of preselected color values in a device dependent color space, and (b) for each one of the first plurality of color values for which there is not corresponding color value in the second color value gamut, the corresponding derived color value is calculated by:

(i) identifying
at least two of the preselected color values adjacent to each one of the color values for which there is no corresponding color value in the device independent color space which is within the color gamut of the device, the two adjacent color values being values for which there are color values in the device independent color space which are within the color gamut of the device, and the derived values corresponding to the at least two preselected color values, and (ii) deriving by extrapolation in the device dependent space from the identified preselected and derived values a corresponding derived value within the second color gamut resulting in an acceptable color representation of the one preselected color value for which there is no corresponding color value within the second color gamut;

(2) using the LUT to modify input color values representing the image; and (3) using the modified input color values to reproduce the image with the device.

2. The method in accordance with claim 1, wherein step (2) comprises:

(a) testing each input color value to determine if there is a corresponding derived color value for said input color value in the LUT and, if any, applying such corresponding derived value to the device for use in reproducing the image in step (3), and (b) if there is no corresponding derived value in the LUT for the input color value, selecting from said LUT a closest set of preselected and corresponding derived values to the input color value and obtaining by interpolation from the closest set of preselected and derived values, a calculated derived value, and applying such calculated derived value to the device for use in reproducing the image in step (3).

3. The method according to claim 2, wherein the extrapolation in the device dependent space is linear extrapolation.

4. The method according to claim 2, wherein the device independent color space is "Lab" and the device dependent space is "RGB".

5. The method in accordance with claim 1, wherein the device dependent space is "YMCK".

* * * * *